United States Patent
Liu

(10) Patent No.: US 12,435,247 B2
(45) Date of Patent: Oct. 7, 2025

(54) IONOMERIC POLYESTER-BASED PRESSURE SENSITIVE ADHESIVES

(71) Applicant: 3M INNOVATIVE PROPERTIES COMPANY, St. Paul, MN (US)

(72) Inventor: Richard Y. Liu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 764 days.

(21) Appl. No.: 17/770,092

(22) PCT Filed: Nov. 11, 2020

(86) PCT No.: PCT/IB2020/060623
§ 371 (c)(1),
(2) Date: Apr. 19, 2022

(87) PCT Pub. No.: WO2021/094950
PCT Pub. Date: May 20, 2021

(65) Prior Publication Data
US 2022/0411670 A1  Dec. 29, 2022

Related U.S. Application Data

(60) Provisional application No. 62/935,714, filed on Nov. 15, 2019.

(51) Int. Cl.
*C09J 7/38* (2018.01)
*B32B 7/12* (2006.01)
(Continued)

(52) U.S. Cl.
CPC ...... *C09J 7/38* (2018.01); *B32B 7/12* (2013.01); *B32B 17/10036* (2013.01);
(Continued)

(58) Field of Classification Search
CPC ............ B32B 7/12; B32B 17/10036; B32B 17/10779; B32B 27/08; B32B 27/36;
(Continued)

(56) References Cited

U.S. PATENT DOCUMENTS 3,998,042 A * 12/1976 Reese .............. D02G 1/18
264/235.6
4,883,706 A * 11/1989 Grosjean .......... G03C 1/93
428/480
(Continued)

FOREIGN PATENT DOCUMENTS

EP   2826832 B1   5/2017
EP   3696243 A1   8/2020
(Continued)

OTHER PUBLICATIONS

International Search Report for PCT Application No. PCT/IB2020/060623 mailed on Feb. 22, 2021, 5 pages.

*Primary Examiner* — Kevin R Kruer
(74) *Attorney, Agent, or Firm* — Jeffrey M. Olofson

(57) ABSTRACT

Polyester compositions are the reaction product of a reaction mixture including at least two different diacids, and at least two different diols. At least one diacid or diol has at least one pendant ethylenically unsaturated group, and at least one diacid or diol has at least one pendant ionic group. The polyester composition has a glass transition temperature in a range of −60° C. to 12° C., and is a vibration-damping, pressure sensitive adhesive.

19 Claims, 1 Drawing Sheet

(51) Int. Cl.
  *B32B 17/10* (2006.01)
  *B32B 27/08* (2006.01)
  *B32B 27/36* (2006.01)
  *C09J 7/22* (2018.01)
  *G10K 11/168* (2006.01)

(52) U.S. Cl.
  CPC ........ *B32B 17/10779* (2013.01); *B32B 27/08* (2013.01); *B32B 27/36* (2013.01); *C09J 7/22* (2018.01); *G10K 11/168* (2013.01); *B32B 2250/40* (2013.01); *B32B 2307/412* (2013.01); *C09J 2203/326* (2013.01); *C09J 2301/302* (2020.08); *C09J 2467/00* (2013.01)

(58) Field of Classification Search
  CPC .......... B32B 2250/40; B32B 2307/412; B32B 17/10761; B32B 2250/03; B32B 2307/102; C09J 7/38; C09J 7/22; C09J 2203/326; C09J 2301/30; C09J 2467/00; C09J 2301/124; C09J 167/07; G10K 11/168; C08G 63/6888
  See application file for complete search history.

(56) References Cited

U.S. PATENT DOCUMENTS

| | | | |
|---|---|---|---|
| 5,186,996 A | 2/1993 | Alts | |
| 5,223,465 A | 6/1993 | Ueki et al. | |
| 5,278,199 A | 1/1994 | Ohkawa et al. | |
| RE34,605 E | 5/1994 | Schrenk et al. | |
| 5,360,659 A | 11/1994 | Arends et al. | |
| 5,502,931 A | 4/1996 | Munir | |
| 5,579,162 A | 11/1996 | Bjornard et al. | |
| 5,691,037 A | 11/1997 | McCutcheon et al. | |
| 5,882,774 A | 3/1999 | Jonza et al. | |
| 5,889,118 A | 3/1999 | Delgado et al. | |
| 5,902,656 A | 5/1999 | Hwang | |
| 6,001,910 A * | 12/1999 | Blumenthal | C09J 167/02 525/445 |
| 6,049,419 A | 4/2000 | Wheatley et al. | |
| 6,123,171 A | 9/2000 | McNett et al. | |
| 6,171,685 B1 * | 1/2001 | George | B32B 27/06 524/451 |
| 6,278,789 B1 | 8/2001 | Potter | |
| 6,536,555 B1 | 3/2003 | Kelsic et al. | |
| 6,576,717 B1 * | 6/2003 | Kuo | C09D 167/06 525/445 |
| 6,787,245 B1 * | 9/2004 | Hayes | C08L 67/02 525/437 |
| 6,954,329 B1 | 10/2005 | Ojeda et al. | |
| 8,424,251 B1 | 4/2013 | Tinianov | |
| 8,962,136 B2 | 2/2015 | Takahira et al. | |
| 8,999,503 B2 | 4/2015 | Takahira et al. | |
| 11,254,779 B1 * | 2/2022 | Dustin | C08G 18/0809 |
| 2002/0079121 A1 | 6/2002 | Ryan | B29C 65/3644 156/384 |
| 2002/0103294 A1 * | 8/2002 | Chisholm | C08L 77/00 525/65 |
| 2002/0111440 A1 * | 8/2002 | Chisholm | C08G 63/916 525/438 |
| 2006/0036054 A1 * | 2/2006 | Upshaw | G11B 5/7021 528/44 |
| 2006/0116464 A1 * | 6/2006 | Brunelle | C08K 9/04 524/604 |
| 2006/0147490 A1 * | 7/2006 | Bowden | C08G 83/003 525/188 |
| 2006/0227439 A1 * | 10/2006 | Taki | C08J 7/0427 359/883 |
| 2008/0085972 A1 * | 4/2008 | O'Brien | A61L 15/58 524/500 |
| 2008/0107990 A1 * | 5/2008 | Field | G03G 9/08791 430/137.14 |
| 2008/0153028 A1 * | 6/2008 | Farrugia | C08G 63/91 430/137.14 |
| 2011/0019275 A1 * | 1/2011 | Suzuki | B29C 55/143 528/308.1 |
| 2011/0019280 A1 * | 1/2011 | Lockridge | C08J 7/0427 428/141 |
| 2012/0208016 A1 | 8/2012 | Takahira et al. | |
| 2012/0208017 A1 | 8/2012 | Yoshie et al. | |
| 2012/0208955 A1 | 8/2012 | Yoshie et al. | |
| 2013/0177263 A1 | 7/2013 | Duan et al. | |
| 2017/0355887 A1 * | 12/2017 | Schumacher | C08G 18/3821 |
| 2018/0201727 A1 * | 7/2018 | Yang | C08G 63/6926 |
| 2018/0215959 A1 | 8/2018 | Liu et al. | |
| 2019/0153259 A1 * | 5/2019 | Li | C08G 18/758 |
| 2020/0216720 A1 | 7/2020 | Sakamoto | |
| 2022/0017677 A1 * | 1/2022 | Guo | C09J 175/08 |
| 2022/0098363 A1 * | 3/2022 | Peterson | C09D 167/02 |
| 2022/0177752 A1 * | 6/2022 | Li | C08G 18/4238 |
| 2022/0186098 A1 * | 6/2022 | Li | B32B 15/20 |
| 2022/0356384 A1 * | 11/2022 | Wu | C08G 18/73 |
| 2022/0411670 A1 * | 12/2022 | Liu | C09J 7/22 |
| 2024/0199928 A1 * | 6/2024 | Guo | C08G 18/10 |
| 2024/0218220 A1 * | 7/2024 | Meng | C09J 175/08 |
| 2025/0059321 A1 * | 2/2025 | Mieda | C09D 11/033 |

FOREIGN PATENT DOCUMENTS

| | | |
|---|---|---|
| JP | 2010106086 A | 5/2010 |
| JP | 5615140 B2 | 10/2014 |
| WO | 2015093526 A1 | 6/2015 |
| WO | 2017030877 A1 | 2/2017 |
| WO | 2017030881 A1 | 2/2017 |
| WO | 2017031042 A1 | 2/2017 |
| WO | 2019073944 A1 | 4/2019 |

* cited by examiner

IONOMERIC POLYESTER-BASED PRESSURE SENSITIVE ADHESIVES

FIELD OF THE DISCLOSURE

The current disclosure relates to ionomeric polyester-based pressure sensitive adhesives and articles prepared with these ionomeric polyester-based pressure sensitive adhesives.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive, is particularly useful for many applications.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

SUMMARY

The current disclosure relates to ionomeric polyester-based pressure sensitive adhesives and articles prepared with these ionomeric polyester-based pressure sensitive adhesives.

Disclosed herein are polyester compositions comprising the reaction product of a reaction mixture comprising: at least two different diacids; at least two different diols; wherein at least one diacid or diol has at least one pendant ethylenically unsaturated group, and wherein at least one diacid or diol has at least one pendant ionic group. The polyester composition has a glass transition temperature in a range of −60° C. to 12° C., and is a vibration-damping, pressure sensitive adhesive.

Also disclosed are adhesive articles. In some embodiments, the adhesive articles comprise a first carrier layer with a first major surface and a second major surface, and a first polyester-based ionomeric adhesive layer with a first major surface and a second major surface, wherein the first major surface of the first polyester-based ionomeric adhesive layer is in contact with the second major surface of the first carrier layer. The polyester-based adhesive layer comprises a polyester composition as described above.

Also disclosed are adhesive laminate articles, where the adhesive laminate articles comprise a first substrate with a first major surface and a second major surface, a first polyester-based ionomeric adhesive layer with a first major surface and a second major surface, where the second major surface of the first substrate is in contact with the first major surface of the first polyester-based ionomeric adhesive layer, and a second substrate with a first major surface and a second major surface, where the second major surface of the first polyester-based ionomeric adhesive layer is adjacent to the first major surface of the second substrate. The first polyester-based adhesive layer comprises a polyester composition as described above.

BRIEF DESCRIPTION OF THE DRAWINGS

The present application may be more completely understood in consideration of the following detailed description of various embodiments of the disclosure in connection with the accompanying drawings.

Figure 1:
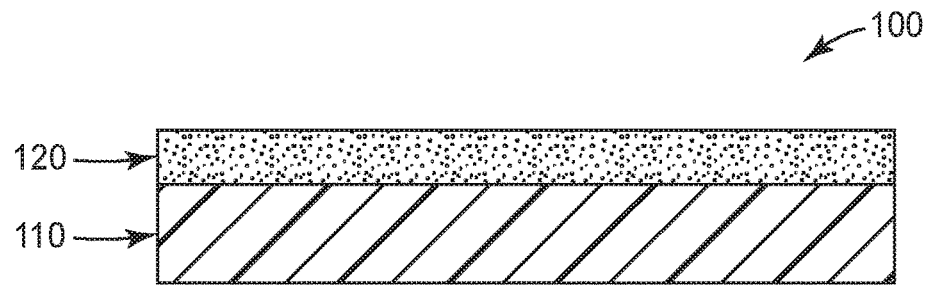
FIG. 1 shows a cross-sectional view of an embodiment of an article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Adhesives have been used for a variety of marking, holding, protecting, sealing and masking purposes. One type of adhesive, a pressure sensitive adhesive, is particularly useful for many applications. The use of adhesives, especially pressure sensitive adhesives, in areas such as the medical, electronic and optical industries is increasing. The requirements of these industries place additional demands upon the pressure sensitive adhesive beyond the traditional properties of tack, peel adhesion and shear strength. New classes of materials are desirable to meet the increasingly demanding performance requirements for pressure sensitive adhesives. Among the additional demands being placed upon pressure sensitive adhesives are optical properties, such as transparency, vibration-damping properties, or even combinations of these properties.

Optical properties, such as being optically transparent or optically clear, are defined in greater detail below. Vibration-damping refers to the energy dissipation properties of a material under cyclical stress and involves the conversion of mechanical energy to thermal energy. The amount of energy dissipated is a measure of the material's damping level.

One common use of vibration-damping materials is to reduce or eliminate noise caused by resonance and vibration. Damping materials work by changing the natural vibration frequency of the vibrating surface and thereby lowering radiated noise and increasing the transmission loss of the material. Many applications and products are subject to vibration from internal, as well as external sources.

The most common damping mechanism used to address vibration (and noise) problems is viscoelastic damping. Viscoelastic means that the material exhibits both elastic and viscous behavior. An elastic material is one that stores energy during a load and all energy is returned when that load is removed. A viscous material doesn't return any energy. All energy is lost as "pure damping" once the load is removed. A viscoelastic material therefore stores some of the energy during a load and then the remainder is released as heat.

The present disclosure comprises ionomeric polyester-based pressure sensitive adhesives that have vibration-damping properties and, in some embodiments, also have desirable optical properties. It is surprising that polyester-based materials are suitable for these pressure sensitive adhesives.

While there are examples of polyester-based adhesives, most of these adhesives are hot melt adhesives or curable structural adhesives. Hot melt adhesives are thermoplastic materials that melt and flow upon heating, form an adhesive bond upon cooling to room temperature. At room temperature, the hot melt adhesive is not tacky. Curable structural adhesives, also called thermoset materials, are ones that are applied in an uncured state and upon curing form an adhesive bond that is permanent. There are relatively few examples of polyester pressure sensitive adhesives.

Polyesters may be formed as the reaction product of diacids and diols. For example, terephthalic acid (a diacid) and ethylene glycol (a diol) can be reacted to form polyethylene terephthalate (PET). More generally, one or more diacids and one or more diols can be reacted, in equal molar portions of total diacids and total diols, to form a polyester comprising residues of the diacids and residues of the diols. The term residue when used in reference to the components of a polyester, refers to the moiety in the polyester resulting from the reaction of a corresponding monomer. In some cases, polyesters are formed from the reaction of diesters with diols by transesterification. In this reaction, instead of replacement of a hydrogen atom with a hydrocarbon group, it involves replacement of a hydrocarbon group (such as a methyl group) with a different hydrocarbon group (a diol).

Disclosed herein are polyester compositions that comprise the reaction product of a reaction mixture comprising: at least two different diacids; at least two different diols; at least one diacid or diol with at least one pendant ethylenically unsaturated group, and at least one diacid or diol with at least one pendant ionic group. The polyester composition is a vibration-damping, pressure sensitive adhesive.

Also disclosed are adhesive articles that include the polyester pressure sensitive adhesive compositions. The adhesive articles comprise a carrier layer with a pressure sensitive adhesive layer disposed on at least a portion of the carrier layer surface. In some embodiments the carrier layer is a release substrate such as a release liner. In other embodiments, the carrier layer of the adhesive article comprises a substrate layer. Examples of substrate layers include film layers and rigid substrates.

In embodiments where the carrier layer is a release liner, the adhesive article is called a dual-sided tape. Dual-sided tapes, also called "transfer tapes" are adhesive tapes that have adhesive on both exposed surfaces. In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. For example, a multi-layer transfer tape may be a 3-layer construction with an adhesive layer, a film layer and another adhesive layer. The film layer can provide handling and/or tear strength or other desirable properties.

Also disclosed are laminate articles comprising a first substrate, and adhesive layer, and a second substrate. The adhesive layer comprises an ionomeric polyester-based pressure sensitive adhesive.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases, and the adhesive becomes tacky.

The terms "Tg" and "glass transition temperature" are used interchangeably. If measured, Tg values are determined by Differential Scanning Calorimetry (DSC) at a scan rate of 20° C./minute, unless otherwise indicated.

The term "polyester-based" as used herein refer to polymers or units of polymers that contain polyester linkages. Polyester linkages are well understood in the art as being formed by the reaction of diols (HO—$R^a$—OH) with diacids ($HO_2C$—$R^b$—$CO_2H$), where $R^a$ and $R^b$ are independently alkylene, arylene, aralkylene, or substituted alkylene, arylene, aralkylene groups. Substituted alkylene, arylene, aralkylene may include hydrocarbon groups, heteroatom groups, or functional groups. Polyester-based polymers may contain other linkages, but at least the majority of linkages are polyester linkages.

The term "polyester-containing" as used herein refers to molecule or polymer in which at least some of the repeat units are polyester units. Polyester units are ones that are linked by ester linkages, ester linkages have the general structure R$^a$O—(CO)—R$^b$, where R$^a$ and R$^b$ are alkylene, arylene, or aralkylene groups and (CO) is a carbonyl group C=O.

The term "hydrocarbon group" as used herein refers to any monovalent group that contains primarily or exclusively carbon and hydrogen atoms. Alkyl and aryl groups are examples of hydrocarbon groups.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

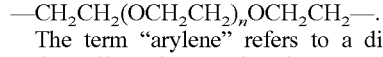
—CH$_2$CH$_2$(OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$ where R$^a$ is an alkylene and Ar$^a$ is an arylene (i.e., an alkylene is bonded to an arylene).

The term "(meth)acrylate" refers to monomeric acrylic or methacrylic esters of alcohols. Acrylate and methacrylate monomers or oligomers are referred to collectively herein as "(meth)acrylates".

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically transparent" refers to an article, film or adhesive that has a high light transmittance over at least a portion of the visible light spectrum (about 400 to about 700 nm). Typically, optically transparent articles have a luminous transmission of at least 80%, often at least 85%. The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze. Typically, optically clear layers have a luminous transmission of at least 90% and a haze of less than 5%. In some embodiments, the optically clear layers have a luminous transmission of at least 95% and a haze of less than 2%.

The term "adjacent" as used herein when referring to two layers means that the two layers are in proximity with one another with no intervening open space between them. They may be in direct contact with one another (e.g. laminated together) or there may be intervening layers.

Disclosed herein are polyester compositions comprising the reaction product of a reaction mixture comprising: at least two different diacids; at least two different diols; at least one diacid or diol with at least one pendant ethylenically unsaturated group, and at least one diacid or diol with at least one pendant ionic group. The polyester composition is a pressure sensitive adhesive and has a glass transition temperature in a range of −60° C. to 12° C. The polyester pressure sensitive adhesive has a wide range of desirable properties such as a vibration-damping, and in some embodiments is also optically transparent or even optically clear.

The polyester composition can be prepared by preparing a reaction mixture, heating the reaction mixture with stirring, and removing the water byproduct of the condensation reaction. Typically, the water or alcohol byproduct is removed at a reduced pressure. As mentioned above, the reaction mixture comprises: at least two different diacids; at least two different diols; at least one diacid or diol with at least one pendant ethylenically unsaturated group, and at least one diacid or diol with at least one pendant ionic group. Additionally, the reaction mixture may contain optional reactive or non-reactive additives such as comprises at least one catalyst selected from the acetate, phosphate, acid, or oxide form of antimony, zinc, cobalt, titanium, iron, potassium, calcium, and combinations thereof, or stabilizing agents selected from primary antioxidant, secondary antioxidant, antiozonant, UV absorber, hindered amine stabilizer, phosphate stabilizer, acid scavenger, heat stabilizer, and combinations thereof.

The reaction mixture comprises at least two different diacids. A wide range of diacids are suitable for use in the reaction mixture. In general, the diacids are of general Formula 1 below:

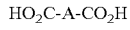
HO$_2$C-A-CO$_2$H          Formula 1 wherein A comprises a divalent group comprising an alkylene, arylene, heteroalkylene, heteroarylene, aralkylene, cyclic, branched, or a combination thereof. The selection of diacids depends upon the specific properties desired for the polyester copolymer.

In some embodiments, at least one of the diacids comprises an alkylene diacid of general Formula 1A below:

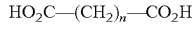
HO$_2$C—(CH$_2$)$_n$—CO$_2$H          Formula 1A wherein n is an integer from 1-12. Examples of suitable alkylene diacids include: malonic acid (n=1); succinic acid (n=2); glutaric acid (n=3); adipic acid (n=4); pimelic acid (n=5); suberic acid (n=6); azelaic acid (n-=7); sebacic acid (n=8); undecanedioc acid (n=9); and dodecanedioc acid (n=10). Particularly suitable alkylene diacids include adipic acid, suberic acid and sebacic acid.

In some embodiments, at least one of the diacids is an arylene diacid, where the arylene is substituted or unsubstituted. Examples of suitable arylene diacids include: phthalic acid; terephthalic acid; isophthalic acid; dibenzoic acid; and 2.6-napththalenedicarboxylic acid. Particularly suitable arylene diacids include terephthalic acid and isophthalic acid.

In some embodiments, diesters are used instead of diacids, and the polymerization reaction, is a transesterification reaction. Exemplary diesters are shown in Formula 1B below:

  Formula 1B wherein A comprises a divalent group comprising an alkylene, arylene, heteroalkylene, heteroarylene, aralkylene, cyclic, branched, or a combination thereof, as described above. The group E is an alkyl group with 1-10 carbon atoms. Examples of suitable E groups include methyl groups (dimethyl ester), propyl groups (dipropyl esters), and butyl groups (dibutyl esters). The selection of diester depends upon the specific properties desired for the polyester copolymer. In the transesterification reaction the E group is replaced by a different alcohol group to generate an EOH alcohol byproduct instead of the water byproduct of the diacid-diol reaction.

In some embodiments, at least one of the diesters comprises an alkylene diester of general Formula 1B' below:

  Formula 1B' wherein n is an integer from 1-12, and E is an alkyl group with 1-10 carbon atoms, as described above. Examples of suitable E groups include methyl groups (dimethyl ester), propyl groups (dipropyl esters), and butyl groups (dibutyl esters). The selection of diester depends upon the specific properties desired for the polyester copolymer. As used herein, the terms "diacid" and "diester" are used interchangeably to describe the precursor to polyesters.

The reaction mixture comprises at least two different diols. A wide range of diols are suitable for use in the reaction mixture. In general, the diols are of general Formula 2 below:

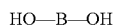  Formula 2 wherein B comprises a divalent group comprising an alkylene, arylene, heteroalkylene, heteroarylene, aralkylene, cyclic, branched, or a combination thereof. The selection of diols depends upon the specific properties desired for the polyester copolymer.

In some embodiments, at least one of the diols comprises an alkylene diol of general Formula 2A below:

  Formula 2A wherein n is an integer from 2-12. Examples of suitable alkylene diacids include: ethylene glycol (n=2); 1, 4-butane diol (n=4); 1,5-pentane diol (n=5); 1,6-hexane diol (n=6); 1,8-octane diol (n=8); and 1,10-decane diol (n=10). Besides these straight chain diols, other 1, 2-diols, also called vicinal diols, are suitable such as are described by general Formula 2B below:

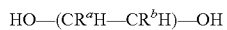  Formula 2B wherein each $R^a$ and $R^b$ independently comprises a hydrogen atom or an alkyl group with a 1-6 carbon atoms. In some embodiments, $R^a$ is H and $R^b$ is a methyl group, and the compound is 1,2-propane diol. In other embodiments, $R^a$ and $R^b$ are both methyl and the compound is 2,3-butane diol.

In some embodiments, the diol of Formula 2 is a cycloalkylene diol. In these embodiments, the B group comprises a cycloalkylene group. Particularly suitable cycloalkylene diols are those with 6-membered cycloalkylene rings, such as CHDM (1,4-cyclohexane dimethanol.

In some embodiments, the diol of Formula 2 is branched diol, such as neopentyl glycol (2,2-dimethylpropane-1,3-diol).

Particularly suitable alkylene diols include ethylene glycol, 1,6-hexane diol (typically referred to as hexane diol), and CHDM.

In some embodiments, at least one of the diols is an arylene diol, where the arylene is substituted or unsubstituted. Examples of suitable arylene diols include the isomers of dihydroxybenzenes: 1,2-dihydroxybenzene commonly referred to as catechol; 1,3-dihydroxybenzene commonly referred to as resorcinol; 1,4-dihydroxybenzene commonly referred to as hydroquinone; and chain extended phenols such as bisphenol A and bisphenol F.

The reaction mixture also comprises at least one diacid or a diol with at least one pendant ethylenically unsaturated group. A wide range of diacids or diols with at least one pendant ethylenically unsaturated group are suitable. Suitable diacids and diols with a pendant ethylenically unsaturated group are described by general Formula 3 below:

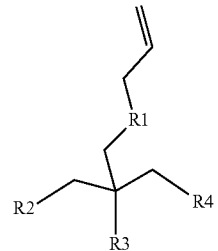  Formula 3 wherein R1 is linking group comprising —O—, —$(CH_2)_m$—, —COO—, —OCO—, —OOC—, —S—, —(C=O)— or their combinations; R2 and R4 are either an —OH group or a —$CO_2H$ group; and R3 is —H, —$(CH_2)_n CH_3$, or —$(CH_2)_n OH$, where n is an integer of 0-10.

In some embodiments, the diol with at least one pendant ethylenically unsaturated group is TMPTE (trimethylolpropane monoallyl ether) which is described by Formula 3 wherein R1 is an —O— group; R2 and R4 are each —OH groups; and R3 is —$CH_2OH$.

In other exemplary embodiments, monomers represented by any of Formulas 4 to 6 may be chosen.

Formula 4

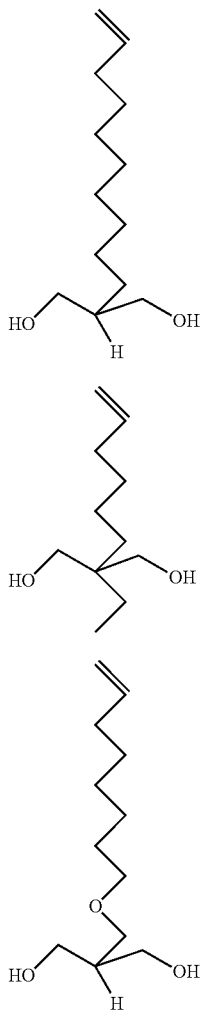

Formula 5

Formula 6

In still other embodiments, monomers represented by any of the Formulas 4 to 6 with the —OH groups replaced by —COOH groups (or alternatively by ester groups) may be used. Additional suitable diacids or diols with at least one pendant ethylenically unsaturated group include the monomers described in US Patent Publication No. 2018/0215959.

The amount of diacid or diol with at least one pendant ethylenically unsaturated group included in the reaction mixture can vary over a wide range depending upon the desired properties of the formed polyester copolymer. In some embodiments, the diacid or diol with at least one pendant ethylenically unsaturated group comprises 0.001-10 mole % of the total diacid and diol reaction mixture.

The reaction mixture also comprises at least one diacid or a diol with at least one pendant ionic group. A wide range of diacids or diols with at least one pendant ionic group are suitable. Suitable diacids with at least one pendant ionic group are described by general Formula 7 below:

$$X-Z-(CO_2H)_2 \quad \text{Formula 7}$$

wherein X is an ionic group; Z is a trifunctional hydrocarbon group that may be aliphatic, aromatic or a combination thereof. Suitable ionic groups include sulfonate groups —$SO_3^-$. In some embodiments, the trifunctional hydrocarbon group is an aromatic group and the compound of Formula 7 is the sodium salt or lithium salt of (sulfo) isophthalic acid commercially available from FUTUREFUEL Chemical Company, Batesville, AK as FUTURECHEM SSIPA (Formula 7A below) or FUTURECHEM LiSIPA (Formula 7B below):

Formula 7A

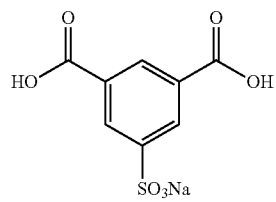

Formula 7B

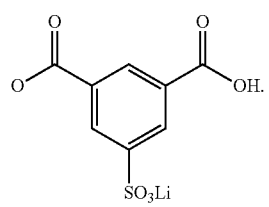

Suitable counterions for monomers of Formula 7 include protons (H$^+$), lithium (Li$^+$), sodium (Na$^+$), potassium (K$^+$), magnesium (Mg$^{2+}$), calcium (Ca$^{2+}$), aluminum (Al$^{3+}$), Zinc (Zn$^{2+}$), or combinations thereof.

Suitable diols with at least one pendant ionic group are described by general Formula 8 below:

$$X-Z-(L-OH)_2 \quad \text{Formula 8}$$

wherein X is an ionic group; Z is a trifunctional hydrocarbon group that may be aliphatic, aromatic or a combination thereof; and L is a linking group that may be an aliphatic group, an aromatic group, or an ester-containing group. Suitable ionic groups include sulfonate groups —$SO_3^-$. In some embodiments, the trifunctional hydrocarbon group is an aromatic group and the compound of Formula 8 is the lithium salt commercially available from FUTUREFUEL Chemical Company, Batesville, AK as FUTURESOL EG LiSIP (Formula 8A below):

Formula 8A

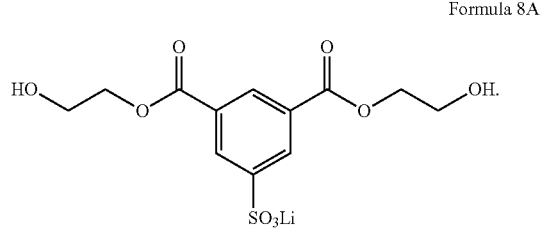

Suitable counterions for monomers of Formula 8 include protons (H$^+$), lithium (Li$^+$), sodium (Na$^+$), potassium (K$^+$), magnesium (Mg$^{2+}$), calcium (Ca$^{2+}$), aluminum (Al$^{3+}$), Zinc (Zn$^{2+}$), or combinations thereof.

The amount of diacid or diol with at least one pendant ionic group included in the reaction mixture can vary over a wide range depending upon the desired properties of the formed polyester copolymer. In some embodiments, the diacid or diol with at least one pendant ionic group comprises 0.001-20 mole % of the total diacid and diol reaction mixture.

The reaction mixture may also comprise reactive or unreactive additives. Among the optional reactive additives are crosslinking agents such as triols. Examples of suitable triols include TMP (trimethylol propane).

Additionally, the reaction mixture may further comprise at least one catalyst to facilitate the condensation reaction. Typically, the catalyst is selected from an acetate, phosphate, acid, or oxide form of antimony, zinc, cobalt, titanium, iron, potassium, calcium and combinations thereof.

Additionally, the reaction mixture may further comprise at least one stabilizing agent selected from primary antioxidant, secondary antioxidant, antiozonant, UV absorber, hindered amine stabilizer, phosphate stabilizer, acid scavenger, heat stabilizer, and combinations thereof.

The polyester compositions of this disclosure have a wide array of properties. The polyester has an intrinsic viscosity of less than 1.2. The polyester composition is a pressure sensitive adhesive and has a glass transition temperature (Tg) in a range of −60° C. to 12° C. Glass transition temperatures can be determined by DSC (Differential Scanning Calorimetry) by scanning at a rate of 10° C./minute. The polyester composition is substantially amorphous with a heat of melting ($\Delta H_m$) as determined by DSC (Differential Scanning Calorimetry) of less than 5 Joules/gram.

The polyester pressure sensitive adhesives of this disclosure have a variety of additional properties besides the typical pressure sensitive adhesive properties. The polyester pressure sensitive adhesive is a vibration-damping material, and in some embodiments is also optically transparent or even optically clear.

The vibration-damping properties of the polymer pressure sensitive adhesives can be measured in a variety of different ways. Typically, dynamic mechanical analysis (DMA) is used to measure the vibration-damping property of the polyester pressure sensitive adhesive. DMA measures Tan δ, where Tan δ is the tangent of the phase angle and the ratio of G"/G'. In some embodiments, the polyester composition has a Tan δ of 1.0-3.0.

In some embodiments, the polyester pressure sensitive adhesive is optically transparent having a luminous visible light transmission of at least 80%, and a haze of less than 10%. In other embodiments, the polyester pressure sensitive adhesive is optically clear having a luminous visible light transmission of at least 90%, and a haze of less than 5%.

Also disclosed are adhesive articles. The adhesive articles comprise a first carrier layer with a first major surface and a second major surface, and a first polyester-based ionomeric adhesive layer with a first major surface and a second major surface, where the first major surface of the first polyester-based ionomeric adhesive layer is in contact with the second major surface of the first carrier layer. The first polyester-based ionomeric adhesive layer comprises the polyester compositions described above.

A wide variety of the first carrier layers are suitable. Typically, the first carrier layer comprises a polymeric film or a release liner. Examples of polymeric films include films comprising one or more polymers such as cellulose acetate butyrate; cellulose acetate propionate; cellulose triacetate; poly(meth)acrylates such as polymethyl methacrylate; polyesters such as polyethylene terephthalate, and polyethylene naphthalate; copolymers or blends based on naphthalene dicarboxylic acids; polyether sulfones; polyurethanes; polycarbonates; polyvinyl chloride; syndiotactic polystyrene; cyclic olefin copolymers; and polyolefins including polyethylene and polypropylene such as cast and biaxially oriented polypropylene. The substrate may comprise single or multiple layers, such as polyethylene-coated polyethylene terephthalate. The substrate may be primed or treated to impart some desired property to one or more of its surfaces. Examples of such treatments include corona, flame, plasma and chemical treatments.

One particularly suitable class of film substrates are optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and anti-fingerprint films.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

In some embodiments, the first carrier layer is a release liner. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like, and combinations thereof). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film.

The adhesive article may be a multi-layer article. In these embodiments the articles comprise, besides the first carrier layer and the adhesive layer, further comprising a film substrate with a first major surface and a second major surface, wherein the second major surface of the first polyester-based ionomeric adhesive layer is in contact with the first major surface of the film substrate.

A wide variety of film substrates are suitable. One particularly suitable class of film substrates are optical films. Optical films have been described in detail above. Optically transparent or optically clear films are particularly suitable.

In some embodiments, the adhesive article comprises a transfer tape article. Typically, the transfer tape articles comprise a first polyester-based ionomeric adhesive layer and a film substrate as described above. The adhesive article further comprises a second polyester-based ionomeric adhesive layer with a first major surface and a second major surface, wherein the first major surface of the second polyester-based ionomeric adhesive layer is in contact with the second major surface of the film substrate. The second polyester-based ionomeric adhesive layer may be the same as the first polyester-based ionomeric adhesive layer, or it may be different.

In some embodiments, the adhesive article may further comprise a second carrier layer with a first major surface and a second major surface, wherein the first major surface of the second carrier layer is in contact with the second major surface of the second polyester-based ionomeric adhesive layer.

Examples of uses for the multi-layer adhesive articles include use in safety glass, such as automotive windshields, where the adhesive article is sandwiched between two rigid glass plates.

Also disclosed herein are adhesive laminate articles. In these articles an adhesive is located between two substrates. In some embodiments, the adhesive laminate articles comprise a first substrate with a first major surface and a second major surface, a first polyester-based ionomeric adhesive layer with a first major surface and a second major surface, wherein the second major surface of the first substrate is in contact with the first major surface of the first polyester-based ionomeric adhesive layer, and a second substrate with a first major surface and a second major surface, wherein the second major surface of the first polyester-based ionomeric adhesive layer is adjacent to the first major surface of the second substrate. The first polyester-based ionomeric adhesive layer comprises the ionic polyester adhesives described above. In some embodiments, the polyester composition comprises the reaction product of a reaction mixture comprising at least two different diacids, at least two different diols, at least one diacid or diol with at least one ethylenically unsaturated group, and at least one diacid or diol with at least one pendant ionic group. The polyester has a glass transition temperature in a range of −60° C. to 12° C., and the polyester composition is a vibration-damping, pressure sensitive adhesive.

In some embodiments, the adhesive laminate article is an optically transparent article where the pressure sensitive adhesive is optically transparent and the first and second substrates comprise optically transparent substrates.

A wide range of optically transparent substrates are suitable. The substrates may be rigid substrates or non-rigid substrates. Examples of rigid substrates include glass plates, laminated glass plates, and relatively thick polymeric plates such as polymethyl methacrylate (PMMA) plates and polycarbonate (PC) plates.

Examples of suitable non-rigid substrates include polymeric films. Examples of suitable polymeric films including optical films have been described in detail above.

Also disclosed are adhesive laminate articles that comprise additional layers. In some embodiments, the adhesive laminate article further comprises a film substrate with a first major surface and a second major surface, wherein the first major surface of the film substrate is in contact with the second major surface of the first polyester-based ionomeric adhesive layer, and a second polyester-based ionomeric adhesive layer with a first major surface and a second major surface, wherein the first major surface of the second polyester-based ionomeric adhesive layer is in contact with the second major surface of the film substrate, and wherein the second major surface of the second polyester-based ionomeric adhesive layer is in contact with the first major surface of the second substrate. Examples of suitable film substrates include monolithic or multi-layer optical films as described above. The second polyester-based ionomeric adhesive layer is an adhesive layer as described above and may be the same as the first polyester-based ionomeric adhesive layer or it may be different.

The ionomeric adhesive layer, that is to the first polyester-based ionomeric adhesive layer as well as the second polyester-based ionomeric adhesive layer may have a wide range of thicknesses. Typically, each adhesive layer has a thickness of 25-7,620 micrometers (1-300 mils). Again, the first and second adhesive layer may have the same thickness or they thickness of the adhesive layers may be different.

The adhesive articles and laminate constructions that include polyester-based ionomeric adhesive layers of this disclosure are further illustrated in the Figures.

FIG. 1 shows a cross-sectional view of article 100, which is an adhesive article. The article comprises adhesive layer 120, and carrier layer 110. Adhesive layer 120 is a polyester-based ionomeric adhesive layer as described above.

Figure 2:
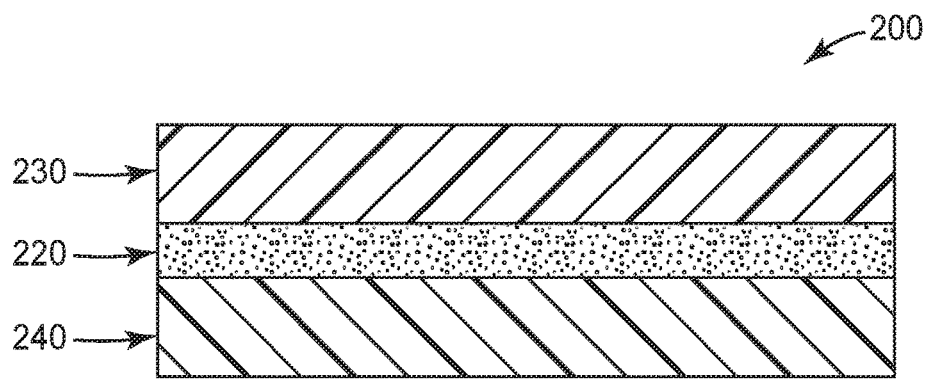
FIG. 2 shows a cross-sectional view of an embodiment of a laminate article of this disclosure.

FIG. 2 shows a cross-sectional view of laminate construction 200. The laminate construction has first substrate 230 and second substrate 240, where the first and second substrates may be the same or different and may be rigid or flexible. Adhesive layer 220 is located between first substrate 230 and second substrate 240. Adhesive layer 220 is a polyester-based ionomeric adhesive layer as described above.

Figure 3:
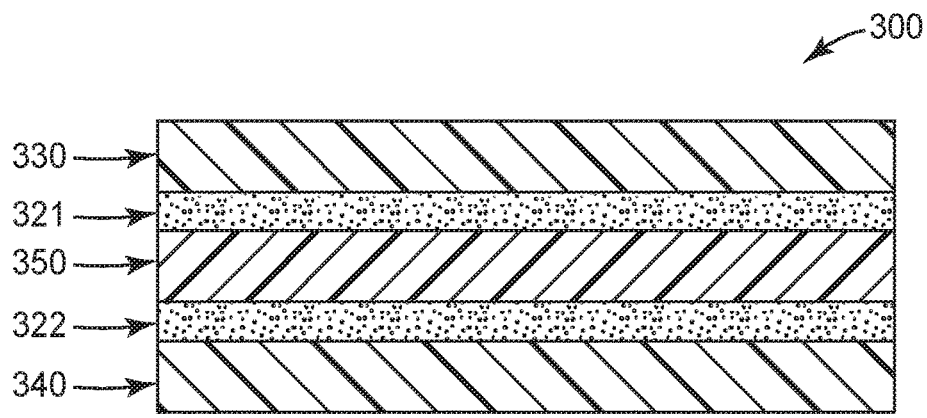
FIG. 3 shows a cross-sectional view of another embodiment of a laminate article of this disclosure.

FIG. 3 shows a cross-sectional view of laminate construction 300. The laminate construction has first substrate 330 and second substrate 340, where the first and second substrates may be the same or different and may be rigid or flexible. First adhesive layer 321 is in contact with first substrate 330 and film substrate 350. Film substrate 350 is also in contact with second adhesive layer 322 which is also in contact with second substrate 340. Adhesive layers 321 and 322 are polyester-based ionomeric adhesive layers as described above and may be the same or they may be different.

EXAMPLES

Polyester adhesive compositions were made and characterized for material properties. A laminate using the polyester PSA and window glass sheets was also made and tested. These examples are merely for illustrative purposes only and are not meant to be limiting on the scope of the appended claims. All parts, percentages, ratios, etc. in the examples and the rest of the specification are by weight, unless noted otherwise. The following abbreviations are used herein: μm=micrometers; ° C.=degrees centigrade; min=minute; Tg=glass transition temperature; ΔHm=heat of fusion; Hz=Hertz; kg=kilograms; kPa=kilopascal; mmHg=millimeters of mercury; psi=pounds per square inch.

TABLE 1

Abbreviations for materials and reagents used in the Examples.

| RM | Chemical Description | Supplier |
|---|---|---|
| SA | Sebacic acid, CAS Number 111-20-6 | Sigma-Aldrich, St. Louis, MO USA |
| IA | Isophthalic acid, CAS Number: 121-91-5 | Sigma-Aldrich, St. Louis, MO USA |
| SSIPA | 5-Sulfoisophthalic acid sodium salt, CAS Number 6362-79-4 | Sigma-Aldrich, St. Louis, MO USA |

TABLE 1-continued

Abbreviations for materials and reagents used in the Examples.

| RM | Chemical Description | Supplier |
|---|---|---|
| EG | Ethylene glycol, CAS Number: 107-21-1 | Sigma-Aldrich, St. Louis, MO USA |
| CHDM | 1,4-Cyclohexanedimethanol, CAS Number: 105-08-8 | Sigma-Aldrich, St. Louis, MO USA |
| HD | 1,6-Hexanediol, CAS Number: 629-11-8 | Sigma-Aldrich, St. Louis, MO USA |
| NPG | Neopentyl glycol, CAS Number 126-30-7 | Sigma-Aldrich, St. Louis, MO USA |
| TMPME | Trimethylolpropane allyl ether, CAS Number: 682-11-1 | Sigma-Aldrich, St. Louis, MO USA |
| TMP | Trimethylolpropane, CAS Number 77-99-6 | Sigma-Aldrich, St. Louis, MO USA |
| NaOAc | Sodium acetate, CAS Number: 127-09-3 | Sigma-Aldrich, St. Louis, MO USA |

TABLE 1-continued

Abbreviations for materials and reagents used in the Examples.

| RM | Chemical Description | Supplier |
|---|---|---|
| TBT | Titanium butoxide, CAS Number 5593-70-4 | Sigma-Aldrich, St. Louis, MO USA |
| TEPA | Phosphate Stabilizer, CAS No. 545-55-1 | Sigma-Aldrich, St. Louis, MO USA |
| Film 1 | 3M Sun Control Window Film Prestige | 3M Company, St. Paul, MN USA |

Test Methods

Glass Transition (Tg) and Heat of Fusion (ΔHm)

Glass Transition (Tg) and Heat of Heat of Fusion (ΔHm) for polyester compositions were analyzed by a Q1000 Differential Scanning Calorimeter (DSC), commercially available from TA Instruments (New Castle, DE). The scanning rate was 20° C./min from −80° C. to 200° C.

Intrinsic Viscosity (IV)

The intrinsic viscosity of the polyester compositions was determined according to ASTM D4603-03 "Standard Test Method for Determining Inherent Viscosity of Poly(ethylene terephthalate) by Glass Capillary Viscometer" except that the polyester compositions are used in place of the PET.

Tan δ for Damping Performance

The magnitude of the damping performance for the polyester compositions was characterized by tan δ peak height at glass transition temperature using a Rheometer commercially available from TA Instruments (New Castle, DE) with a model number of DH-2. The scanning frequency was at 1 Hz. The scanning temperature range was from −60° C. to 100° C. The scanning rate was 3° C./min. The measured tan δ peak height was reported.

Visible Transmission (T %) and Haze (%)

Visible Transmission and Haze of polyester composition was determined using a HAZE-GARD PLUS meter available from BYK-Gardner Inc. (Silver Springs, Md.) which complies with the ASTM D1003-13 standard: "Standard Test Method for Haze and Luminous Transmittance of Transparent Plastics". A 100 μm thick sample was melt extruded and then laminated through a heated nip at 100° C. to a 25 μm thick optically clear Poly(ethylene terephthalate) film on both sides to provide a smooth and glossy surface to minimize surface haze interference.

Examples

TABLE 2

Compositions-Polyester Ionomers

| | Diacids (100 mol %) | | | Diols (100 mol %) | | | | | Additives | | | |
|---|---|---|---|---|---|---|---|---|---|---|---|---|
| Ex. # | SA | IA | SSIPA | EG | CHDM | HD | NPG | TMPME | TMP | NaOAc | TBT | TEPA |
| Ex. 1 | 49.0% | 50.0% | 1.0% | 9.8% | 30.0% | 30.0% | 30.0% | 0.20% | 0.022% | 0.004% | 0.044% | 0.176% |
| Ex. 2 | 75.0% | 20.0% | 5.0% | 9.8% | 30.0% | 30.0% | 30.0% | 0.20% | 0.022% | 0.004% | 0.044% | 0.176% |
| Ex. 3 | 70.0% | 20.0% | 10.0% | 8.0% | 30.0% | 30.0% | 30.0% | 2.0% | 0.022% | 0.004% | 0.044% | 0.088% |
| Ex. 4 | 70.0% | 10.0% | 20.0% | 8.0% | 30.0% | 30.0% | 30.0% | 2.0% | 0.022% | 0.009% | 0.044% | 0.088% |
| Ex. 5 | 70.0% | 29.0% | 1.0% | 17.0% | 25.0% | 25.0% | 25.0% | 8.0% | 0.022% | 0.013% | 0.044% | 0.088% |
| Ex. 6 | 0.0% | 99.5% | 0.5% | 9.5% | 0.0% | 90.0% | 0.0% | 0.5% | 0.022% | 0.013% | 0.044% | 0.088% |
| C. Ex. 1 | 60.0% | 10.0% | 30.0% | 8.0% | 30.0% | 30.0% | 30.0% | 2.0% | 0.022% | 0.013% | 0.044% | 0.088% |

Examples 1-6 (Ex. 1-Ex. 6) and Comparative Example 1 (C. Ex. 1)

A 4.5 kg batch polyester adhesive composition was synthesized in an 8000 cubic centimeter reactor with the raw materials charged according to compositions listed in Table 2 for each Example. The mixture was heated to a temperature of 248° C. at a pressure of two atmospheres (270 kPa) and the mixture allowed to react while removing the water as by-product. After completing the esterification reaction and water removed, the pressure was then reduced to 0.5 to 5 mmHg range while heating the reactor to 271° C. The condensation by-product was continuously removed until a polymer of viscous nature was produced. The resulting polyester adhesive was characterized using various testing methods and the properties are summarized in Table 3.

Example 7. Glass/PSA/Film/PSA/Glass Laminate

The polyester composition of Example 2 was extruded into an adhesive transfer tape between two release liners using a twin-screw extruder at 180° C. to a targeted 100 μm thickness. The resulting tape was optically clear and has haze value of less than 1%. This tape was then laminated onto a multilayer optical film (Film 1) on both surfaces through a heated nip at about 100° C. and 30 psi pressure to form a uniform ABA laminate construction (A=adhesive; B=Film 1). The resulting laminate remained optically clear with high optical clarity and haze value of less than 1%. The laminate was then used as an interlayer to laminate two sheets of 2 mm thick glass together to form a CABAC construction using a rubber roller. In this construction: ABA is the PSA/Film/PSA laminate; C=Glass Sheets. The above laminate was then treated in an autoclave under 140° C. and about 14 kg/cm² pressure for about 30 minutes followed by cool down to ambient temperature. This resulted in the window glass laminate with high optical clarity and haze value of less than 1%.

Results

Table 3 Results

TABLE 3

Results

| Ex. # | Tg (° C.) | ΔHm (J/g) | IV | Tanδ (Tg) | T % (Visible) | Haze (%) |
|---|---|---|---|---|---|---|
| Ex. 1 | −22 | 0 | 0.93 | 2.1 | 90% | <1% |
| Ex. 2 | −40 | 0 | 0.65 | 1.9 | 90% | <1% |
| Ex. 3 | −43 | 0 | 0.54 | 1.5 | 90% | <1% |
| Ex. 4 | −50 | 0 | 0.33 | 1.3 | 90% | <1% |
| Ex. 5 | −38 | 0 | 0.80 | 1.8 | 90% | <1% |
| Ex. 6 | 12 | 0 | 0.50 | 3.0 | 90% | <1% |
| C. Ex. 1 | −48 | 24 | 0.24 | 1.0 | <80% | 30% |

The Comparative Example 1, with high ionomer content shows significant crystallinity by Melting Peak of 24 J/g from DSC.

What is claimed is:

1. An adhesive article comprising:
   a first carrier layer with a first major surface and a second major surface; and
   a first polyester-based ionomeric adhesive layer with a first major surface and a second major surface, wherein the first major surface of the first polyester-based ionomeric adhesive layer is in contact with the second major surface of the first carrier layer, and
   wherein the polyester-based adhesive layer comprises:
      a polyester composition comprising the reaction product of a reaction mixture comprising:
         at least two different diacids;
         at least two different diols;
         wherein at least one diacid or diol has at least one pendant ethylenically unsaturated group, and
         wherein at least one diacid or diol has at least one pendant ionic group;
      wherein the polyester composition has a glass transition temperature in a range of 60° C. to 12° C., and
      wherein the polyester composition is a vibration-damping, pressure sensitive adhesive, and further comprising a film substrate with a first major surface and a second major surface, wherein the second major surface of the first polyester-based ionomeric adhesive layer is in contact with the first major surface of the film substrate.

2. The adhesive article of claim 1, wherein the at least one diacid or diol with at least one pendant ionic group comprises 0.001-20 mole % of the total diacid and diol reaction mixture.

3. The adhesive article of claim 1, wherein the at least one diacid or diol with at least one pendant ionic group comprises a sulfonated diacid or diol.

4. The adhesive article of claim 3, wherein the at least one diacid or diol with at least one pendant ionic group comprises a sulfonated aromatic diacid or diol.

5. The adhesive article of claim 1, wherein the at least one diacid or diol with at least one pendant ethylenically unsaturated group comprises 0.001-10 mole % of the total diacid and diol reaction mixture.

6. The adhesive article of claim 1, wherein vibration-damping, as measured by dynamic mechanical analysis (DMA), comprises a Tan δ of 1.0-3.0, wherein Tan δ is the tangent of the phase angle and the ratio of G"/G'.

7. The adhesive article of claim 1, wherein the pressure sensitive adhesive is optically transparent having a luminous visible light transmission of at least 80%, and a haze of less than 10%, or optically clear having a luminous visible light transmission of at least 90%, and a haze of less than 5%.

8. The adhesive article of claim 1, wherein the polyester is substantially amorphous with a heat of melting (ΔH$_m$) as determined by DSC (Differential Scanning calorimetry) of less than 5 Joules/gram.

9. The adhesive article of claim 1, wherein the polyester has an intrinsic viscosity of less than 1.2.

10. The adhesive article of claim 1, wherein the first carrier layer comprises a polymeric film or a release liner.

11. The adhesive article of claim 1, wherein the film substrate comprises a monolithic or multi-layer optical film.

12. The adhesive article of claim 1, further comprising a second polyester-based ionomeric adhesive layer with a first major surface and a second major surface, wherein the first major surface of the second polyester-based ionomeric adhesive layer is in contact with the second major surface of the film substrate.

13. The adhesive article of claim 12, further comprising a second carrier layer with a first major surface and a second major surface, wherein the first major surface of the second carrier layer is in contact with the second major surface of the second polyester-based ionomeric adhesive layer.

14. An adhesive laminate article comprising:
   a first substrate with a first major surface and a second major surface;
   a first polyester-based ionomeric adhesive layer with a first major surface and a second major surface, wherein the second major surface of the first substrate is in contact with the first major surface of the first polyester-based ionomeric adhesive layer; and
   a second substrate with a first major surface and a second major surface, wherein the second major surface of the first polyester-based ionomeric adhesive layer is adjacent to the first major surface of the second substrate, and wherein the first polyester-based ionomeric adhesive layer comprises:
      a polyester composition comprising the reaction product of a reaction mixture comprising:
         at least two different diacids;
         at least two different diols;
         wherein at least one diacid or diol has at least one pendant ethylenically unsaturated group, and
         wherein at least one diacid or diol has at least one pendant ionic group;
      wherein the polyester composition has a glass transition temperature in a range of 60° C. to 12° C., and
      wherein the polyester composition is a vibration-damping, pressure sensitive adhesive.

15. The adhesive laminate article of claim 14, wherein the pressure sensitive adhesive is optically transparent and the first and second substrates comprise optically transparent substrates.

16. The adhesive laminate article of claim 15, wherein the first and second optically transparent substrates are selected from glass, laminated glass, PMMA (polymethylmethacrylate), PC (polycarbonate), PET (polyethylene terephthalate), PVB (polyvinyl butyral), or a combination thereof.

17. The adhesive laminate article of claim 14, further comprising:
- a film substrate with a first major surface and a second major surface, wherein the first major surface of the film substrate is in contact with the second major surface of the first polyester-based ionomeric adhesive layer; and
- a second polyester-based ionomeric adhesive layer with a first major surface and a second major surface, wherein the first major surface of the second polyester-based ionomeric adhesive layer is in contact with the second major surface of the film substrate, and wherein the second major surface of the second polyester-based ionomeric adhesive layer is in contact with the first major surface of the second substrate.

18. The adhesive laminate article of claim 17, wherein the film substrate comprises a monolithic or multi-layer optical film.

19. The laminate article of claim 17, wherein the first and second polyester-based ionomeric adhesive layers comprise the same polyester-based ionomeric adhesive layer and each has a thickness of 25-7,620 micrometers (1-300 mils).

* * * * *